(12) United States Patent
Amadori et al.

(10) Patent No.: US 11,370,620 B2
(45) Date of Patent: Jun. 28, 2022

(54) UNIT FOR TRANSFERRING HORTICULTURAL PRODUCTS, AND RELATED METHOD

(71) Applicant: UNITEC S.P.A., Lugo (IT)

(72) Inventors: Manuel Amadori, Faenza (IT); Maria Elena Fantoni, Bologna (IT); Luca Furieri, Arezzo (IT); Marco Marian, Ravenna (IT); Xhoan Papadhimitri, Gambellara (IT); Andrea Zucchelli, Crevalcore (IT)

(73) Assignee: UNITEC S.P.A., Lugo (IT)

( * ) Notice: Subject to any disclaimer, the term of this patent is extended or adjusted under 35 U.S.C. 154(b) by 909 days.

(21) Appl. No.: 16/073,014

(22) PCT Filed: Jan. 26, 2017

(86) PCT No.: PCT/IB2017/050404
§ 371 (c)(1),
(2) Date: Jul. 26, 2018

(87) PCT Pub. No.: WO2017/130124
PCT Pub. Date: Aug. 3, 2017

(65) Prior Publication Data
US 2021/0198053 A1    Jul. 1, 2021

(30) Foreign Application Priority Data
Jan. 28, 2016 (IT) .................. 102016000008492

(51) Int. Cl.
*B65G 47/90* (2006.01)
*B65G 53/02* (2006.01)

(52) U.S. Cl.
CPC ........... *B65G 47/908* (2013.01); *B65G 53/02* (2013.01); *B65G 2201/0211* (2013.01)

(58) Field of Classification Search
CPC .... B65G 47/90; B65G 47/908; B65G 47/918; B65G 2201/0211; B25J 15/0023;
(Continued)

(56) References Cited

U.S. PATENT DOCUMENTS 2,165,397 A * 7/1939 Mason ................... B65G 51/01
                                                         406/83
4,050,371 A * 9/1977 Sato .......................... A23N 4/04
                                                         99/550
(Continued)

FOREIGN PATENT DOCUMENTS

BE    1008445 A6    5/1996
BE    1017265 A3    5/2008
(Continued)

OTHER PUBLICATIONS

International Search Report dated Apr. 28, 2017 re: Application No. PCT/IB2017/050404, pp. 1-4, citing: DE 295 19 715 U1, WO 2012/093932 A2 and BE 1 017 265 A3.
(Continued)

*Primary Examiner* — Joseph A Dillon, Jr.
(74) *Attorney, Agent, or Firm* — Cantor Colburn LLP

(57) ABSTRACT

A unit for transferring horticultural products between at least one tank, in which the horticultural products float on a fluid mass, and at least one collection container, including a head provided with a plurality of walls normally arranged vertically. The head is movable between at least one collection position, in which the walls are interposed between respective horticultural products, which float on the fluid mass at a respective predefined section of the tank, and at least one unloading position, in which the walls face and are proximate to the collection container. In an active configuration, the transverse elements protrude transversely from the space occupation of the walls to ensure mechanical interference with the fall of the horticultural products as a consequence
(Continued)

of the subsequent lifting of the head and of its transfer toward said unloading position.

6 Claims, 7 Drawing Sheets

(58) Field of Classification Search
CPC .............. B25J 15/0052; B25J 15/0057; B25J 11/0045; B25J 13/082; B25J 13/086; Y10S 901/34; Y10S 901/35
USPC .............. 414/226.01, 790.2, 749.5, 751.1; 198/418.6, 750.11; 700/260
See application file for complete search history.

(56) References Cited

U.S. PATENT DOCUMENTS

| | | | | |
|---|---|---|---|---|
| 4,768,919 | A * | 9/1988 | Borgman | B65G 47/91 53/495 |
| 4,957,628 | A * | 9/1990 | Schulz | B01D 21/0039 210/519 |
| 5,018,776 | A * | 5/1991 | Trygg | B65B 21/186 294/119.3 |
| 5,403,056 | A * | 4/1995 | Wallace | B25J 15/0023 294/98.1 |
| 6,309,001 | B1 * | 10/2001 | Sherwin | A21C 9/08 294/100 |
| 7,503,449 | B2 * | 3/2009 | Suter | A23N 1/003 193/25 FT |
| 7,581,636 | B2 * | 9/2009 | Martinez | A21B 1/48 198/418.6 |
| 8,109,698 | B2 * | 2/2012 | De Greef | B65G 51/01 406/106 |
| 10,023,336 | B2 * | 7/2018 | Gomez | B65B 35/58 |
| 10,029,865 | B1 * | 7/2018 | McCalib, Jr. | B65G 47/90 |
| 10,369,701 | B1 * | 8/2019 | Diankov | B25J 15/0616 |
| 10,913,165 | B1 * | 2/2021 | Jonas | B25J 15/0683 |
| 2005/0028495 | A1 * | 2/2005 | Blanc | B65G 47/918 53/537 |
| 2006/0043747 | A1 * | 3/2006 | Kniss | B25J 15/0061 294/65 |
| 2008/0118340 | A1 * | 5/2008 | Baumstimler | B65B 35/52 414/799 |
| 2012/0282066 | A1 * | 11/2012 | Naumann | B25J 15/0052 414/226.05 |
| 2016/0074874 | A1 * | 3/2016 | Gardiner | B03B 5/623 209/155 |
| 2017/0265392 | A1 * | 9/2017 | Van De Vegte | B25J 15/0683 |
| 2018/0170688 | A1 * | 6/2018 | Kikuchi | B25J 15/0023 |
| 2018/0215540 | A1 * | 8/2018 | Tanaka | B25J 19/0004 |
| 2019/0039840 | A1 * | 2/2019 | Amadori | B65G 47/908 |
| 2019/0135465 | A1 * | 5/2019 | Beesley | B65B 39/02 |
| 2019/0230972 | A1 * | 8/2019 | Tao | B26D 5/007 |
| 2019/0308331 | A1 * | 10/2019 | Hurwit | B25J 13/08 |
| 2020/0086500 | A1 * | 3/2020 | Papen | B65B 23/02 |
| 2020/0189122 | A1 * | 6/2020 | Polido | B25J 15/0625 |
| 2020/0269429 | A1 * | 8/2020 | Chavez | B25J 15/0616 |
| 2020/0398314 | A1 * | 12/2020 | Maeda | B07C 5/24 |
| 2021/0002086 | A1 * | 1/2021 | Stauffer | B25J 15/0061 |
| 2021/0094766 | A1 * | 4/2021 | Ikeya | B25J 15/0683 |
| 2021/0094767 | A1 * | 4/2021 | Bergmeier | B65B 5/068 |
| 2021/0101760 | A1 * | 4/2021 | Yabe | B65G 61/00 |
| 2021/0179366 | A1 * | 6/2021 | McCoy, Jr. | B25J 15/0675 |
| 2021/0198053 | A1 * | 7/2021 | Amadori | B65G 53/02 |

FOREIGN PATENT DOCUMENTS

| | | |
|---|---|---|
| CL | 2018002026 A1 | 12/2018 |
| DE | 29519715 U1 | 3/1996 |
| JP | 2001354318 A | 12/2001 |
| WO | 2012093932 A2 | 7/2012 |
| WO | 2017130125 A1 | 8/2017 |

OTHER PUBLICATIONS

Written Opinion dated Apr. 28, 2017 re: Application No. PCT/IB2017/050404, pp. 1-5, citing: DE 295 19 715 U1, WO 2012/093932 A2 and BE 1 017 265 A3.

* cited by examiner

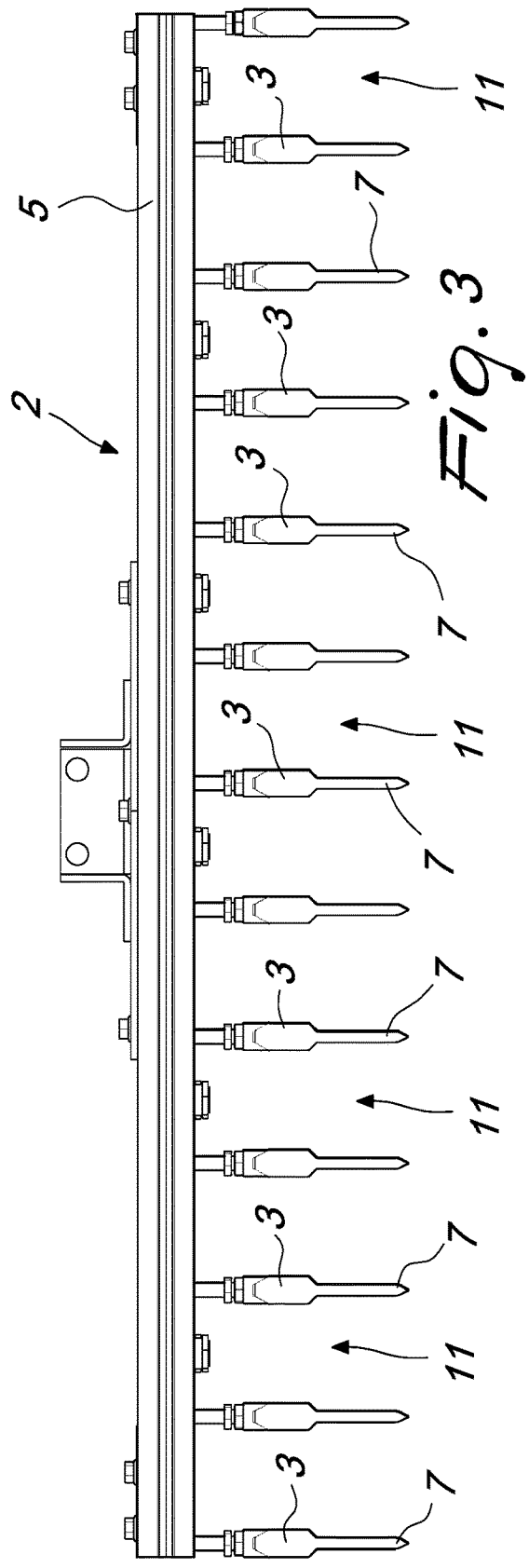
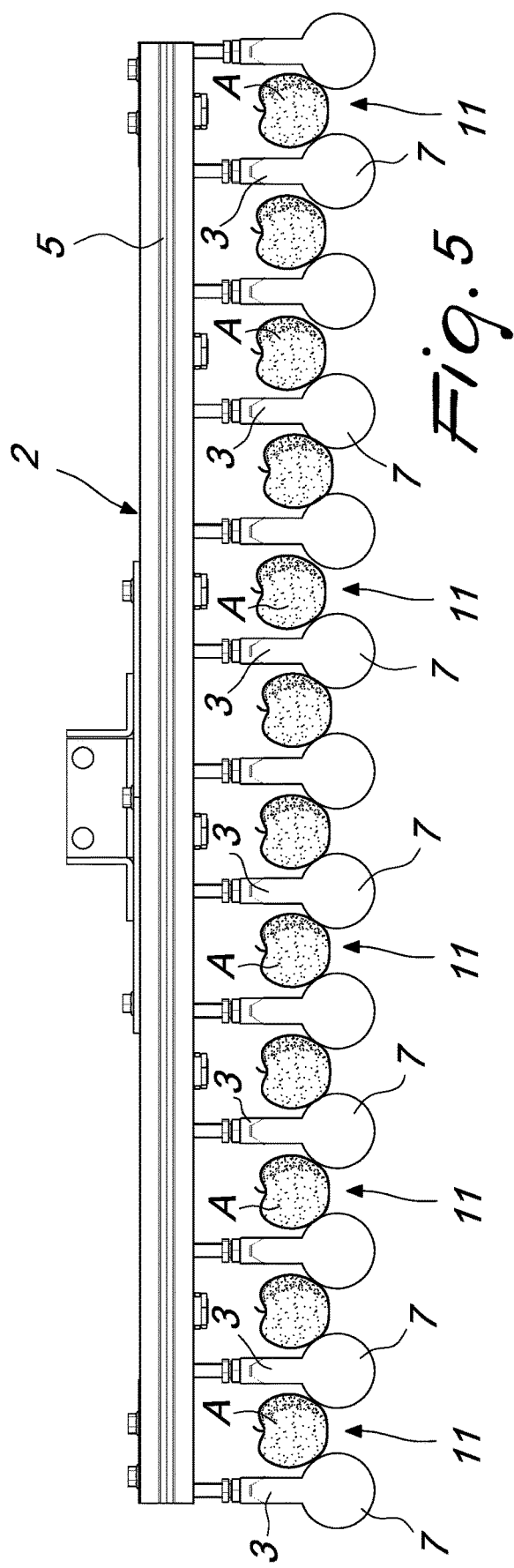

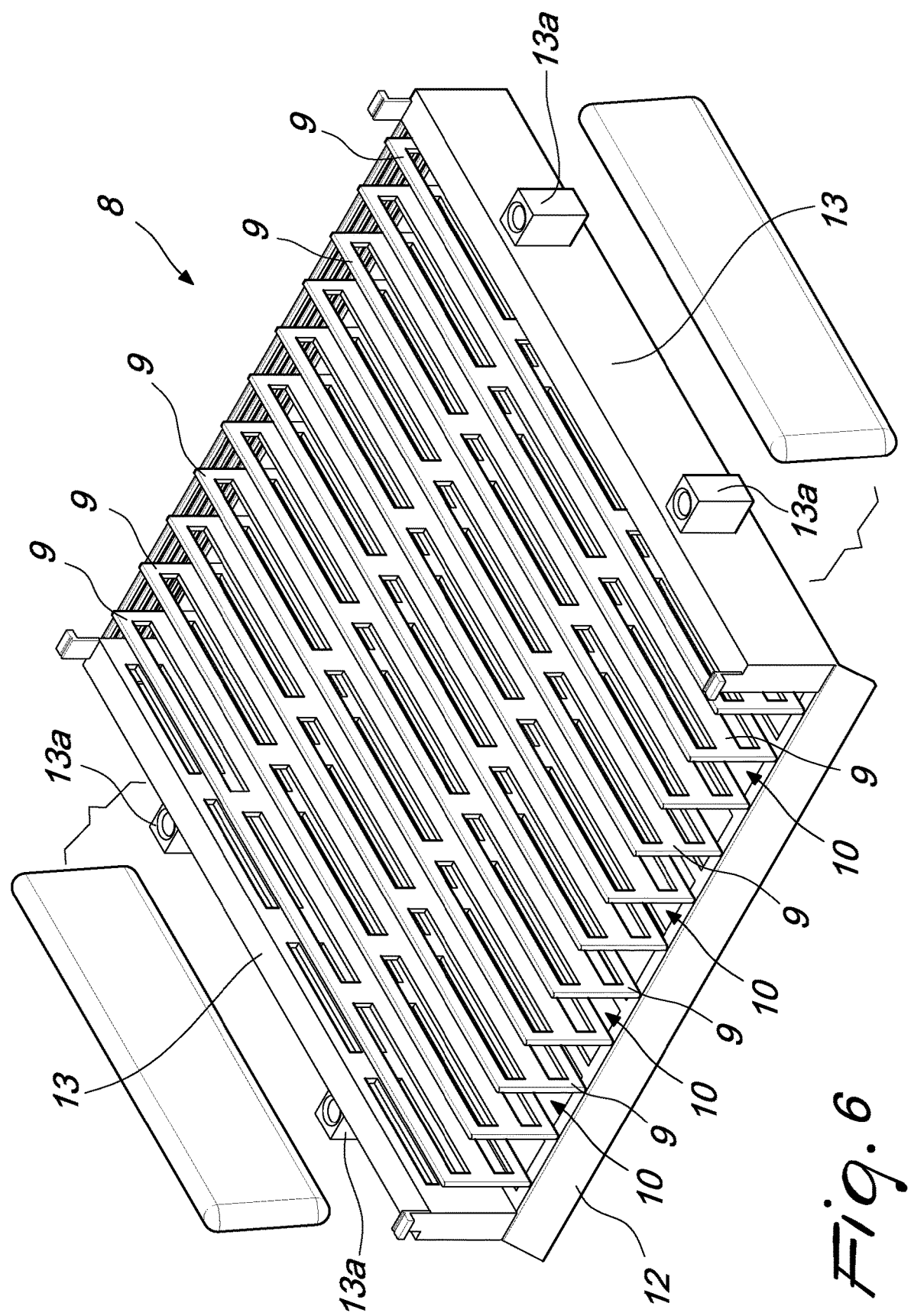

UNIT FOR TRANSFERRING HORTICULTURAL PRODUCTS, AND RELATED METHOD

TECHNICAL FIELD

The present disclosure relates to a unit for transferring horticultural products and to the related method.

BACKGROUND

Currently there is a growing number of industrial fields that resort to automation to an extreme extent, in order to optimize and standardize the various work activities allowing mass productions at modest costs.

This scenario is certainly shared by companies working in the food industry, which in fact needs to meet a constantly growing demand without renouncing high quality standards.

In greater detail, companies that package and distribute on a large scale horticultural products (particularly fruit) equip themselves with lines and systems intended for handling, checking, grading, packaging and more generally treating said horticultural products.

Each one of the activities briefly outlined in the above paragraph obviously requires specifically studied devices and apparatuses, which are moreover specific for the fruit (or other horticultural product) treated in each instance, since for each fruit the shape, size, structural characteristics etc. pose always new problems to designers.

In this context, one of the known apparatuses that has the greatest drawbacks, proving itself now inadequate for the application requirements, is found in apple treatment lines.

These lines usually have channels in which a stream of water is made to flow on which the apples can float while they pass through various processing stations assigned to different treatments.

At an end section of each channel there is, therefore, the need to transfer the apples to the (typically metallic) box-like containers in which these products will then be transported (or subjected to further processes).

According to known methods, the transfer is entrusted to a complex device, which first of all requires the apples to be progressively compacted at an end section of the channel, until they form such a layer as to fill the entire free surface of said end section.

As soon this condition occurs, the container (previously arranged below the channel) is made to rise, while substantially simultaneously an overlying bell-shaped system draws upward the water and the fruits. The system then deposits the apples in the container while the water is made to flow out through holes provided for this purpose in the walls of the container.

As anticipated, however, this constructive solution is not free from drawbacks.

It should in fact be observed that the apparatus described above allows to transfer and accumulate in each container a number of apples that corresponds to the apples that fill the entire free surface of the chosen end section.

Therefore, the system sets an upper limit to the number of apples that can be transferred into the container, which can be modified and increased only by increasing the area of the free surface of the end section of the channel. Likewise, it is evident that an increase in the end section cannot be increased at will, since this would cause an unacceptable increase in space occupations and water consumption.

Moreover, it should be noted that in this step of the treatment process the mass of apples, which initially supplied the line indiscriminately and heterogeneously, is by now divided into uniform groups (in terms of color and size, for example), each of which must therefore be placed in different containers, for which a respective channel is necessary.

A same line therefore requires a large expenditure of water and the occupation of considerable spaces in the building in which it operates, moreover with significant maintenance costs (for water filtration and recirculation).

Furthermore, it is useful to note that the installation of the line and of the apparatus requires large and expensive masonry interventions on the designated building in order to be able to arrange below the level of the line the containers that arise cyclically at the appropriate moment.

SUMMARY

The aim of the present disclosure is to solve the problems described above, by providing a unit that allows to transfer apples or other horticultural products in a practical manner.

Within this aim, the disclosure proposes a method that allows to transfer apples or other horticultural products in a practical manner.

The disclosure also provides a unit that allows to collect in each container even a large number of apples or other horticultural products, with a structure that is simple and has a modest space occupation.

The disclosure further provides a unit and/or a method that complies with high quality standards, ensuring the transfer of apples or other horticultural products without causing defects in them and for example without subjecting them to impacts.

The disclosure also provides a unit that ensures high reliability in operation.

The disclosure provides a unit that adopts a technical and structural architecture that is alternative to those of units of the known type.

The disclosure also provides a unit that has modest costs and is safe in application.

The disclosure further provides a unit and/or a method that can be obtained (executed) easily starting from commonly commercially available elements and materials.

This aim and these and other advantages that will become better apparent hereinafter are achieved by providing a unit according to the claims and a method as disclosed herein.

BRIEF DESCRIPTION OF THE DRAWINGS

Further characteristics and advantages of the disclosure will become better apparent from the description of a preferred but not exclusive embodiment of the unit according to the disclosure, illustrated by way of nonlimiting example in the accompanying drawings, wherein:

FIG. 3 is a front elevation view of the head of FIG. 2;

FIG. 5 is a front elevation view of the head of FIG. 4 and shows that the transverse elements provide mechanical interference in the fall of the horticultural products;

FIG. 6 is a partially exploded perspective view of a further component of the unit.

DETAILED DESCRIPTION OF THE DRAWINGS

Figure 1:
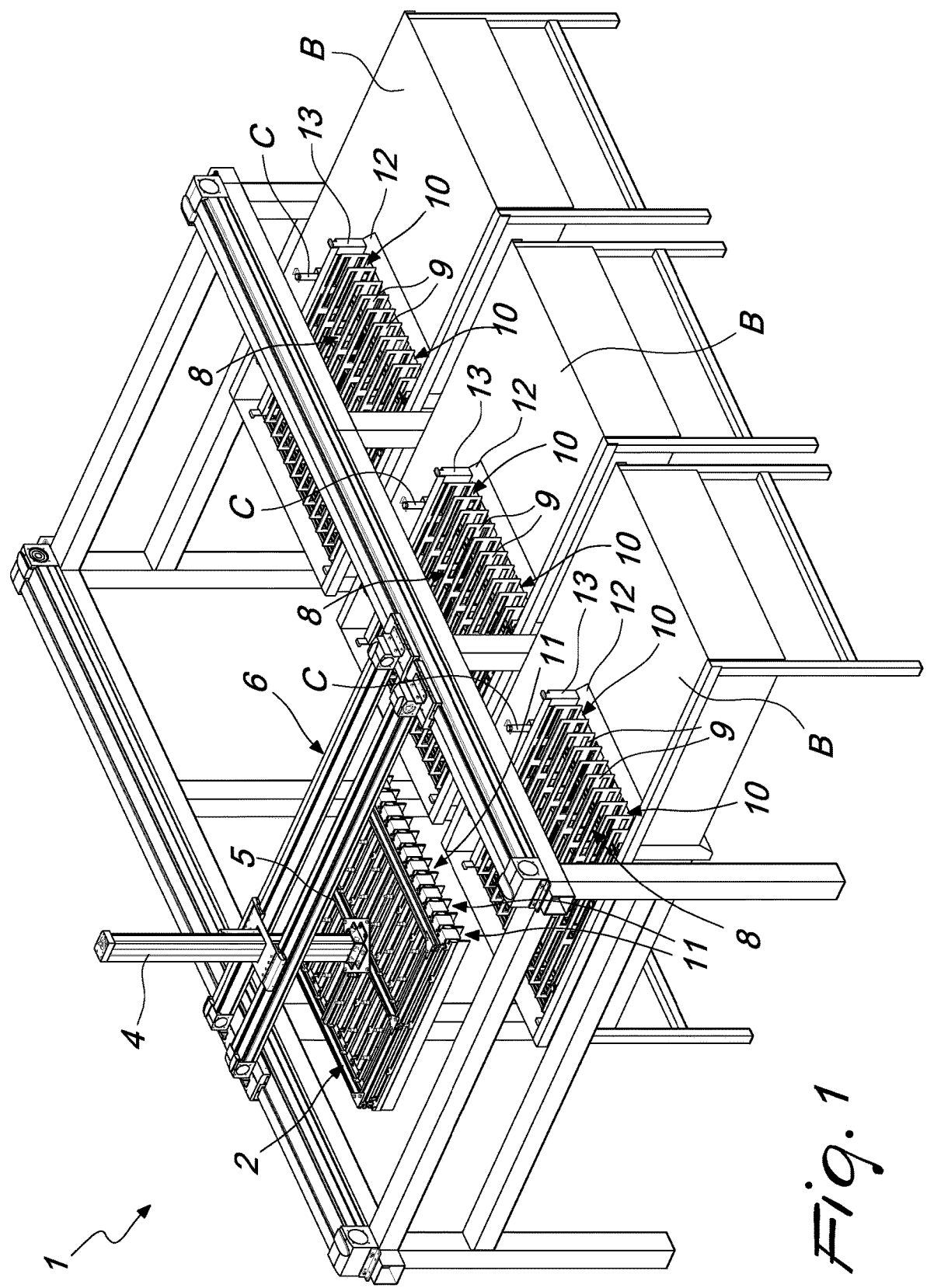
FIG. 1 is a view of the unit according to the disclosure and of its use for the transfer of horticultural products from three tanks.
Figure 2:
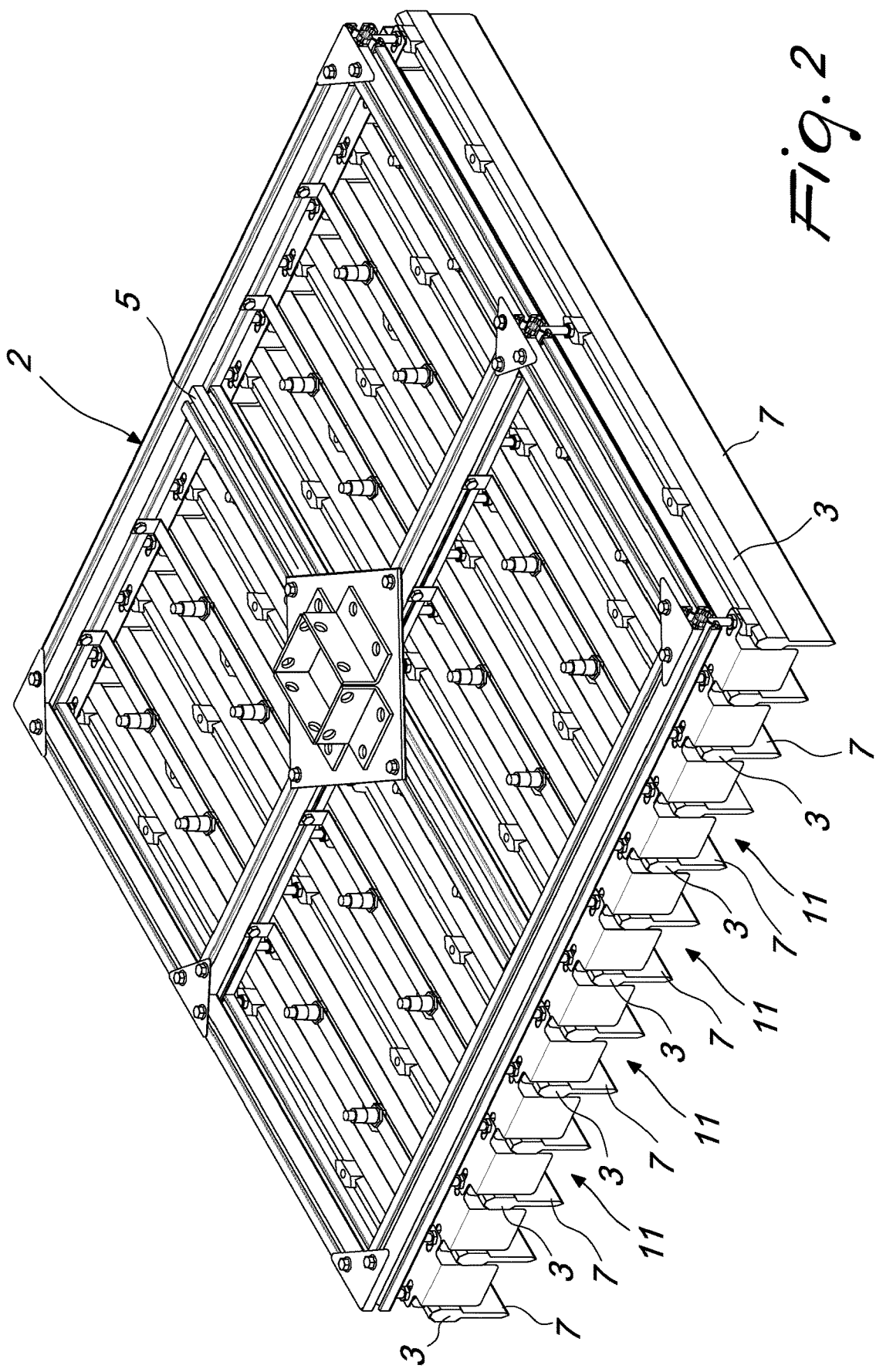
FIG. 2 is a perspective view of the head of the unit according to the disclosure, with the transverse elements in a passive configuration.

With reference to FIGS. 1-8, the reference numeral 1 generally designates a unit for transferring horticultural products A between at least one tank B and at least one collection container.

The unit 1 is (preferably but not exclusively) in fact designed to operate along a line for the treatment of horticultural products A which is indeed provided with one or more tanks B. In the tank B, the horticultural products A float on a fluid mass (typically water) and are preferably entrained downstream by said fluid mass, which is moved in various manners.

Along the line, the horticultural products A can thus be subjected to various treatments (checking, grading, selection, cleaning, etc.) and then the unit 1 takes care to transfer them into respective containers (for example ordinary metallic crates, which are box-shaped and are open upward), in order to make them thus available to the storage system, to the subsequent logistical distribution network or to further treatments.

It is useful to note that in the preferred application the horticultural products A are apples (as also in the accompanying FIGS. 5 and 7): in this context, the line is usually supplied with an indiscriminate mass of apples, which have heterogeneous parameters in terms of color, size, defects, etc. The line has the task of performing a series of checks and inspections on this mass, dividing the apples into uniform subgroups (according to one or more preset parameters), which are intended to be subsequently treated distinctly.

The unit 1 therefore is preferably used in relation to a plurality of tanks B (for example three, as in FIG. 1), each of which is affected by a stream of uniform apples (indeed by virtue of the activities directly upstream, along the line), so that each container can be filled exclusively with apples of the same color or of the same grade, etc.

Moreover, it is useful to point out that the context described above has been outlined by way of non-limiting example of the protective scope claimed herein; as a function of the specific requirements, this protective scope must in fact be understood to be extended to any other type of horticultural product A, even at different portions of automated lines or systems and/or at different moments of the process for the transformation or treatment of said products A.

Therefore, in the pages that follow any reference to apples must be considered as extended to any other horticultural product A (and optionally to other industrial products or blanks, if allowed by the specific requirements of application).

According to the disclosure, the unit 1 comprises a head 2 which has a plurality of walls 3 which are normally (i.e., during use) arranged vertically.

The head 2 can move between at least one collection position and at least one unloading position (which will be described in the paragraphs that follow); the movement of the head 2 can be provided in various manners which are in any case within the protective scope claimed herein.

In the embodiment proposed by way of nonlimiting example of the application of the disclosure, the head 2 comprises a central post 4 which supports at its base a grid-like frame 5 (to which the walls 3 are anchored): in this embodiment, movement is entrusted to a Cartesian robot 6, which by virtue of a plurality of prismatic guides indeed allows to move the head 2 at will between each tank B and the collection container or containers.

It is noted in any case that other methods of embodiment and movement of the head 2 within the protective scope claimed herein are not excluded.

In the collection position, the head 2 skims the free surface of the fluid mass, so as to move the walls 3 into interposition between respective apples or other horticultural products A, which float on the fluid mass at a respective predefined (usually end) section of the tank B, as for example in FIG. 5.

Vice versa, in the unloading position the head 2 is moved until it lies above the base level of the container, which can be constituted by the bottom of the container or by a previously positioned layer of apples, as will become apparent: thus, the walls 3 are in turn arranged so as to face and be proximate to the collection container (at the base level).

Figure 4:
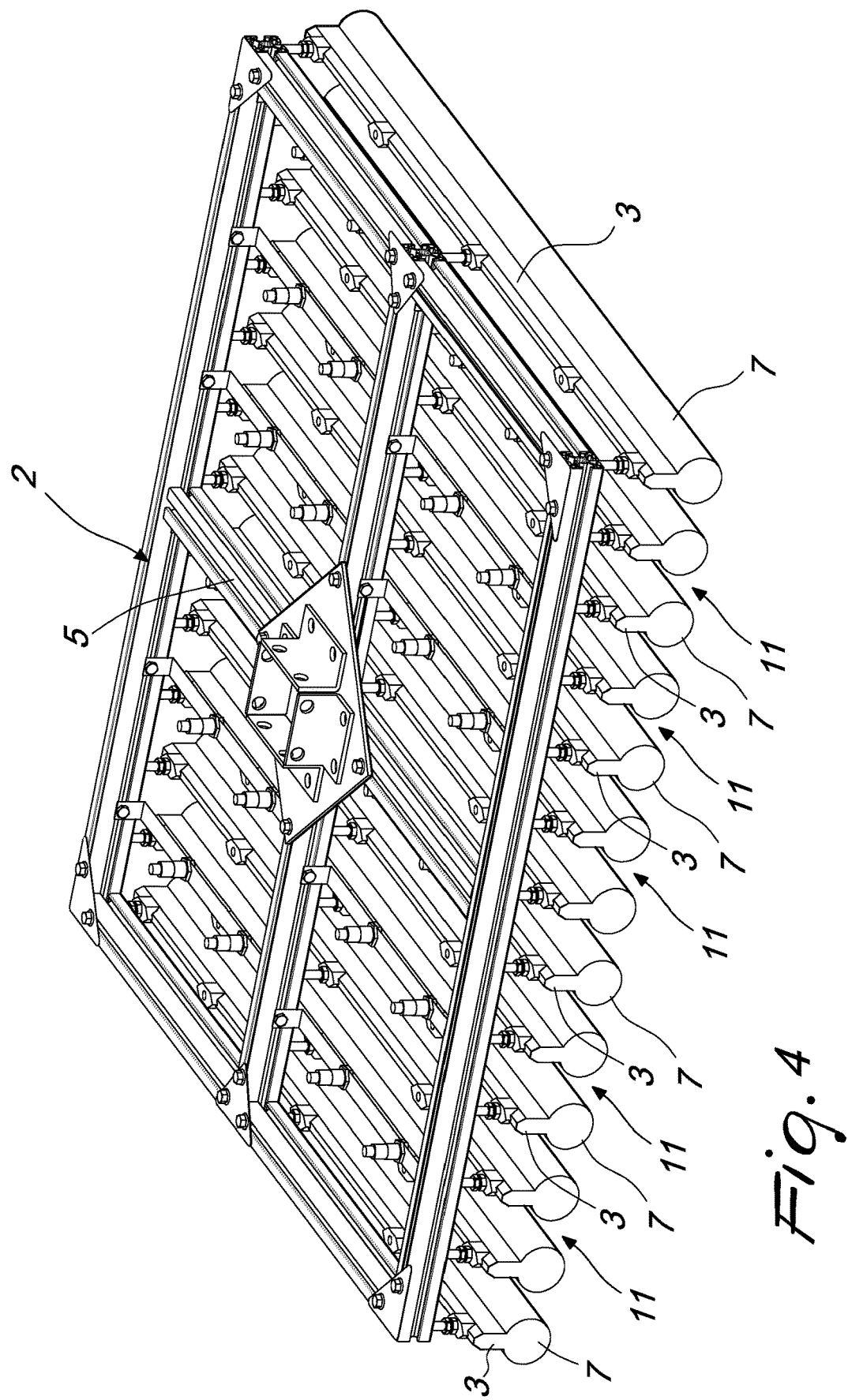
FIG. 4 is a perspective view of the head of FIG. 2 and with the transverse elements in the active configuration.
Figure 7:
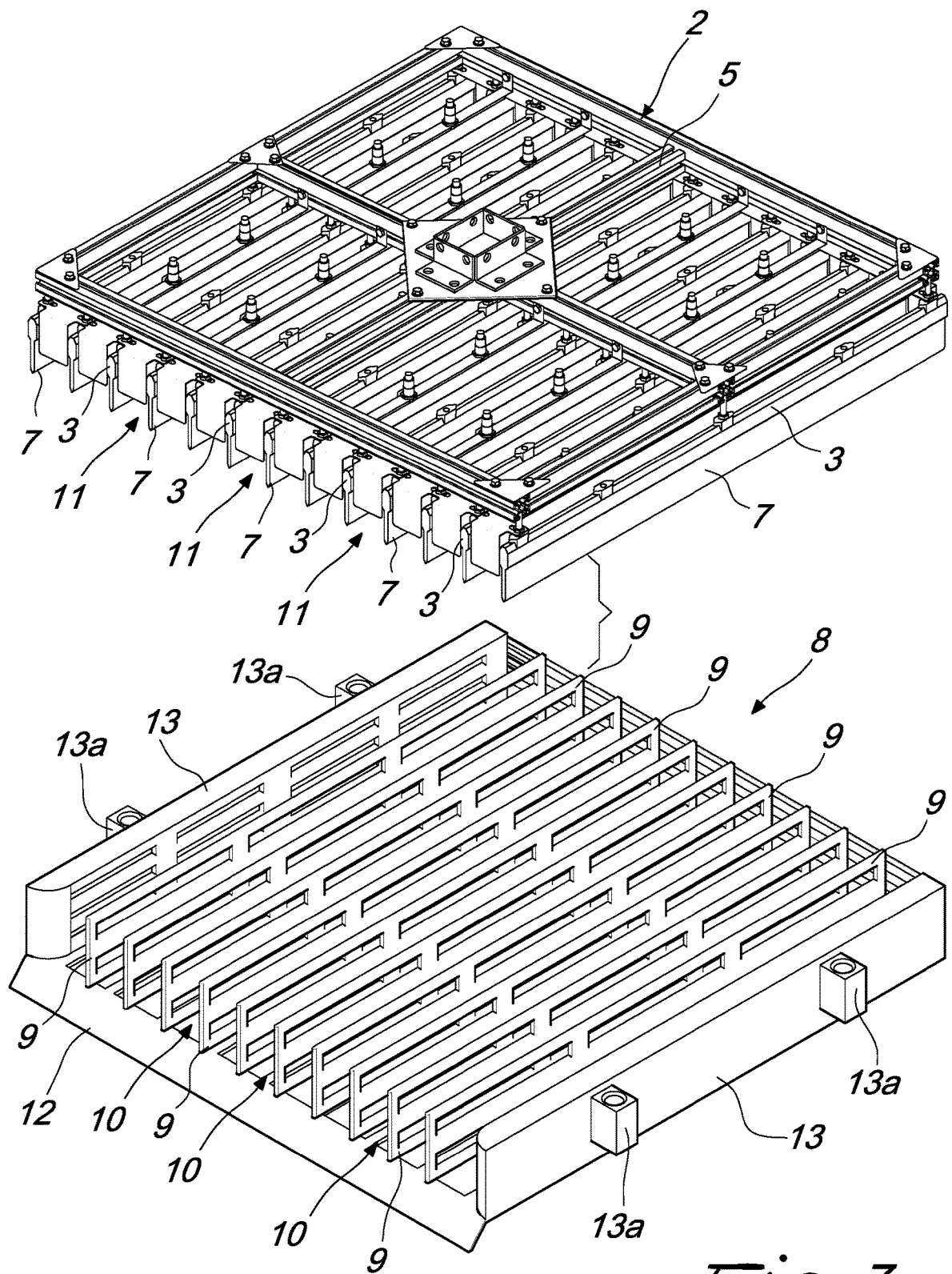
FIGS. 7 and 8 are perspective views of the head and of the additional component of FIG. 6 and, in FIG. 8, their combined use.
Figure 8:
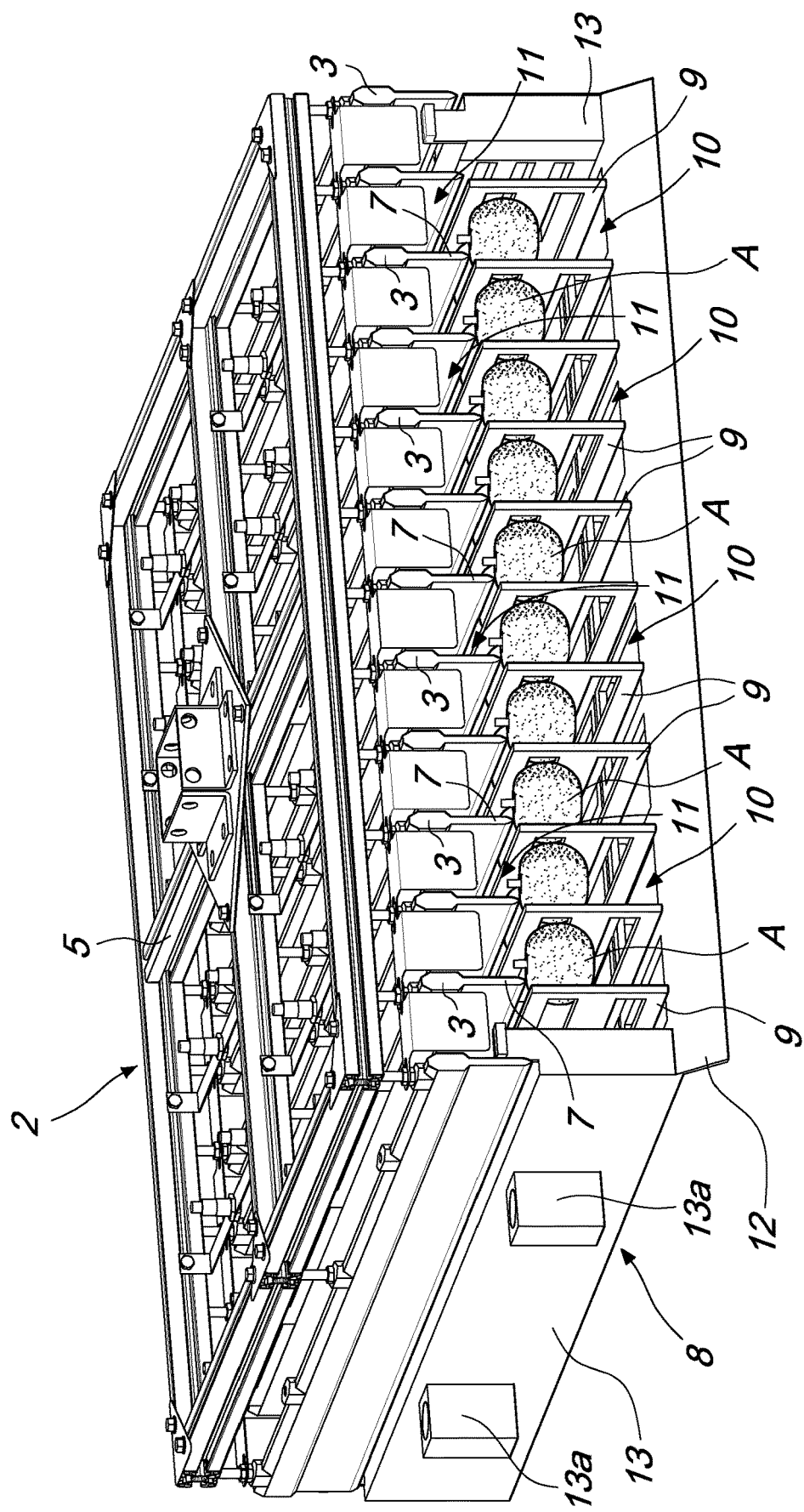

Respective retractable transverse elements 7, which can move between at least one active configuration (in which they are shown in FIGS. 4 and 5) and at least one passive configuration (FIGS. 1, 2, 3, 7 and 8), are therefore associated with the walls 3.

The active configuration can be activated upon reaching the collection position (and maintained as long as the head 2 does not move to the unloading position) and in this configuration the transverse elements 7 protrude transversely from the space occupation of the walls 3. In this manner, they ensure mechanical interference with the fall of the horticultural products A when the head 2 subsequently rises and is transferred towards the unloading position. In practice, therefore, as long as the active configuration is maintained, the apples previously interposed between the walls 3 are picked up by the head 2 and retained by them and the transverse elements 7 (which prevent their fall), allowing vice versa a practical handling thereof.

The passive configuration can be activated upon reaching the unloading position (and subsequently maintained until the head 2 subsequently returns to the collection position): in this position, the transverse elements 7 are retracted toward the walls 3 (in practice, i.e., they do not protrude significantly from them), thus allowing free release of the horticultural products A into the respective collection container.

It is thus evident that the unit 1 achieves the intended aim: after picking up the apples in the loading position, by arranging the walls 3 between them and subsequently activating the elements 7, the head 2 handles their transport to the collection container, where it deposits them simply by deactivating the elements 7 (making them "disappear"), being subsequently able to restart a new operating cycle (in the same tank B and/or in the same collection container or in others).

It should be noted that by stopping the head 2 at a sufficiently small distance from the base of the container (or from the previously positioned layer of apples), release at the unloading position occurs in a delicate and nontraumatic manner for the horticultural products A. Likewise, the pickup methods also are equally gentle and respectful of the quality of the apples, since the elements 7 merely "appear" below them, while they float in the water or other fluid mass, then merely offering a soft resting base and an obstacle to falling when the head 2 rises.

Moreover, it should be noted that the transverse elements 7 may be any according to the specific requirements of application, on condition of being able to ensure the desired lower support for the apples without subjecting them to impacts or traumas.

For example, each transverse element 7 might be constituted by a sort of gate (made of polymeric, metallic or other material), which is inserted retractably in a respective wall 3 and is guided by it: by means of a mechanism, each gate can exit from the wall 3, offering a lower support to the apple, providing the desired mechanical interference.

In the preferred constructive solution, instead, proposed in the accompanying figures by way of nonlimiting illustration of the application of the disclosure, each transverse element 7 is shaped by at least one active portion of at least one membrane (for example an air bladder), which can be inflated on command (by virtue of an adapted pneumatic system) in order to determine its transition from the passive configuration to the active configuration. Of course, the deflation of the membrane allows the reverse transition from the active configuration to the passive configuration.

More particularly, and with further reference to the accompanying figures, the head 2 is provided in a lower region with a plurality of parallel laminas (for example metallic or polymeric ones), which are anchored below the grid-like frame 5 and indeed form respective walls 3.

Said laminas have a substantially constant center distance, which can be adjusted at will so as to ensure maximum versatility to the unit 1.

Each membrane is therefore coupled in a lower region to a corresponding lamina and, as mentioned, can be inflated on command in order to pass from the passive configuration to the active configuration.

In the passive configuration (FIGS. 1, 2, 3, 7 and 8), each membrane has a laminar shape and is therefore substantially aligned vertically with the respective lamina; vice versa, in the active configuration (FIGS. 4 and 5) each membrane has an increased volume and a preferably (but not exclusively) cylindrical shape.

It is specified that each membrane can be coupled directly below the respective lamina, or can cover it at least partially, with a fixed flap thereof, while its remaining part extends freely below and can indeed inflate in order to pass from the passive configuration to the active configuration, and vice versa.

As therefore appears evident also from FIGS. 4 and 5, when the membrane is inflated, respective mutually opposite active portions (which are substantially semicylindrical) of each pair of adjacent membranes (of the elements 7) delimit in a lower region the seat formed by the respective laminas (by the walls 3) and therefore cooperate for mechanical interference with the fall of the horticultural products A.

It should be noted that the longitudinal dimension of the laminas and of the membranes can be chosen at will, and for example can correspond to a corresponding dimension of the base of the collection container (and of the predefined section of the tank B). In this manner, each pair of adjacent membranes is responsible for interference with the fall of a plurality of apples. Likewise, the number of parallel walls 3 can be chosen so that the corresponding transverse dimension of the head 2 corresponds to the other dimension of the base of the collection container (and to the other dimension of the predefined section of the tank B).

Thus, at each operating cycle the unit 1 transfers all the apples that float indeed at the predefined section, forming a corresponding layer in the collection container.

It should be noted therefore that the unit 1 ensures the possibility to accumulate the apples on multiple superimposed layers in the same container. This is of absolute practical interest, since it allows to collect a large number of apples in containers that have a small transverse cross-section, while keeping the dimensions of the predefined section small.

The above allows in other words to overcome one of the main problems of the background art, which indeed does not allow accumulation on superimposed layers and, in order to collect a large number of apples in each container, requires considerable (excessive) dimensions for the tanks and the containers.

The choice to adopt inflatable membranes (besides being a solution that is evidently suitable for work in water) fits effectively the goal of ensuring respect of the apples, avoiding subjecting them to impacts: first of all, in fact, in the collection position, as shown, the membranes are simply inflated below the apples, subsequently forming a soft resting base (for this purpose it is also possible to choose adequately the membrane inflation pressure). The elements 7 do not apply a positive grip to the apples and this spares the apples from impacts or traumas, which otherwise are a potential cause of deterioration or scratches.

At the same time, it should be noted that when the head moves to the unloading position, the membranes substantially move into contact with the bottom level of the collection container: when said bottom level is constituted by a layer of previously deposited apples, the inflated membranes can rest against it in a nontraumatic manner without damaging the apples.

Furthermore, when the membranes are moved from the active configuration to the passive configuration, deflation ensures a substantially gradual release of the apples, therefore again respecting their quality.

After causing deflation, the subsequent rise of the head 2 can occur fully safely, without the membranes offering any resistance.

Usefully, the unit 1 comprises means for detecting a vertical coordinate that is assumed at each working cycle by the top of the horticultural products A when they are released into the collection container at the respective unloading position.

As shown, the unit 1 in fact ensures the possibility to accumulate the apples in the container on multiple layers: the detection means therefore allow correct assessment of the stroke to be imparted to the head 2 in the subsequent working cycle, indeed ensuring progressive filling of a same collection container with superimposed layers of horticultural products A.

Without this solution, an incorrect assessment of the vertical height, which is obviously variable at each cycle, at which the head 2 is to be stopped (in the release position), might cause two events which are in any case dangerous for the quality of the apples. If the membranes deflated without being proximate to the bottom, the apples that they convey would be subjected to an excessive jump and the impact with the underlying apples might cause damage to the former and the latter. Likewise, if the head 2 descends excessively inside the container, the pressure applied to the apples that are already present in the collection container would be equally damaging.

In particular, in the preferred embodiment, which does not limit the application of the disclosure, the detection means comprise at least one proximity sensor, which is anchored in a lower region to the head 2 between respective laminas and is directed toward the transverse elements 7.

The proximity sensor (for example an ultrasound sensor) can thus measure the vertical coordinate assumed at each working cycle by the top of corresponding horticultural products A.

Even more particularly, multiple proximity sensors are arranged below the head 2, between the walls 3 (between the laminas), in order to perform a more accurate calculation of the vertical coordinate of interest.

The data item detected at each cycle by each proximity sensor is in fact transferred to an electronic control and management unit (a controller, software, etc.), associated with the movement system of the head 2.

The electronic unit is provided with modules for processing the collected data, to perform first of all an average of the data acquired at each cycle, and indeed obtain an accurate estimate of the vertical coordinate that corresponds to the top of the apples of the already deposited layer.

By being able to count on the data item related to the descent stroke performed by the head 2 in the container in each cycle, and indeed adding it to the vertical coordinate, the electronic unit can calculate the level of the apples, using this information to calculate the optimum vertical descent stroke to be imparted to the head 2 in the subsequent cycle. In this manner, indeed, one avoids accumulating errors in the calculation of the underlying layer of apples, detecting each time the actual distance between them and the head 2.

Advantageously, the unit 1 also comprises an apparatus for controlling the delivered power, at least when it is close to reaching the unloading position. This allows to detect promptly any peaks in delivered power, which correspond to the resistance offered by horticultural products A previously positioned incorrectly in the collection container.

In fact, without this apparatus, if the head 2 encountered an apple that is "out of place", optionally not detected correctly by the proximity sensors, it would apply an excessive pressure to it, damaging it and in some cases making it rot. This would compromise the quality of all the apples collected in the container. Vice versa, the apparatus monitors the power (and for example, more precisely, the current required by the head 2), activating alarm signals, stopping the head 2 and placing the robot 6 in a safe condition until the problem is solved (removal of the obstacle), when the power (current) exceeds a preset threshold that is detected experimentally and indeed corresponds to an anomaly.

It has already been observed that the unit 1 operates at a predefined, usually terminal, section of the tank B (or of the tanks B). It has also already been noted that the apples are propelled toward said predefined section by a mass of water (or other fluid) that is moved, which allows to accumulate in the predefined section the largest possible number of apples, in practice "filling" the free surface of the fluid mass.

In the preferred embodiment, which is proposed in the accompanying figures but does not limit the application of the disclosure, the unit 1 comprises at least one matrix 8 for aligning the horticultural products A (preferably one for each tank B), which in turn has a plurality of partitions 9.

The partitions 9 can be arranged vertically (longitudinally) along the free surface of the fluid mass, in the predefined section of the tank B (or of each tank B).

Thus, each pair of adjacent partitions 9 forms a respective channel 10 along which the horticultural products A, appropriately propelled toward the predefined section of the tank B, are aligned one by one.

The matrix 8 and the partitions 9 are arranged in such a manner that each channel 10 is arranged in substantial alignment with the interspace 11 that is delimited by a respective pair of adjacent walls 3 when the head 2 moves (descending vertically) toward the collection position.

In practice, therefore, by virtue of the matrix 8, when the head 2 reaches the collection position the apples that occupy the free surface of the predefined section are not distributed randomly and indiscriminately (a condition which might cause greater difficulties when the walls 3 descend between the apples), but in the channels 10 they are already aligned along rows that correspond to the interspaces 11 between the walls 3 (where they are subsequently intended to be accommodated).

As already mentioned for the walls 3, the (preferably constant) distance between adjacent partitions 9 also can be varied at will in order to ensure maximum versatility to the unit 1.

Even more particularly, the matrix 8 comprises a supporting platform 12 for the partitions 9 and has, in at least one active condition, a density that lower than that of the fluid mass.

In this manner, the matrix 8 can float on the free surface of the fluid mass, with the platform 12 submerged and the partitions 9 partially above the surface, so as to allow indeed the alignment of the apples that float on the free surface.

When the head 2 reaches the collection position, the platform 12 is propelled downward by the head 2, since respective resting elements make contact (for example adapted feet arranged at the edges of the head 2 make contact with respective peripheral abutments of the matrix 8). This causes the immersion of the partitions 9 and indeed the interposition of the horticultural products A, previously aligned in the respective channels 10, between corresponding walls 3.

In practice, therefore, until the head 2 arrives the apples are accommodated (aligned) in the channels 10 and interposed between the partitions 9; upon its arrival in the collection position, the head 2 pushes downward the matrix 8 and the walls 3 replace the partitions 9.

It is subsequently possible to activate the active configuration of the corresponding transverse elements 7 and impose the rise of the head 2, with the apples at this point effectively accommodated in the interspaces 11 (with the membranes preventing their fall).

Favorably, the matrix 8 has a density that can vary on command (for example by modifying the internal pressure): this allows it first of all to float at a first vertical height during the alignment of the horticultural products A (in the manners outlined above).

Furthermore, by modifying (lowering) the density of the matrix 8 it is possible to bring it to a second vertical height, which is higher than the first vertical height, in order to cause its partial lifting and settle the horticultural products A inside each channel 10.

This is of unquestionable usefulness; if one or more apples are in an undefined position at the margin of the matrix 8, the partial lifting in fact forces them to fall into one of the channels 10 or outside the matrix 8.

Without a solution of this kind, the incorrectly positioned apples would run the risk of being damaged during the process, with even severe consequences: for example, as the head 2 descends said apples might be cut in half by the external wall 3 and the remaining apple halves would be conveyed into the container, where they would rot, damaging all the other apples accommodated therein as well.

Of course, when the head 2 moves away again from the tank B, the density of the matrix 8 is modified again to return it to the first vertical height.

It should be noted that preferably the matrix 8 is provided with lateral guides 13, which keep it adequately coupled to the tank B during the descending and rising motion caused by the density variations, preventing unwanted modifications to the configuration.

For example, as in the accompanying figures, each lateral guide 13 can comprise a lateral bar, which is arranged at a respective side of the platform 12 and is provided with at least one corresponding slider 13*a*, which can be coupled slidingly to a corresponding track C, which is anchored to the internal lateral surfaces of the tank B, so as to indeed guide its descending and rising motion.

The disclosure also relates to a method for transferring horticultural products A between at least one tank B, in which the horticultural products A float on a fluid mass, and at least one collection container.

The method includes first of all, in a step a., in conveying the horticultural products A, which float on the fluid mass, toward a predefined section of the tank B.

Subsequently (or also at least partially simultaneously) the method provides, in a step b., for moving toward the predefined section of the tank B a supporting head 2 for a plurality of walls 3 which are normally arranged vertically.

In step b., the movement continues until the head 2 is brought to a collection position, in which the walls 3 are interposed between respective horticultural products A, which still float on the free surface of the fluid mass.

Then, in a step c., the method according to the disclosure entails causing the passage of respective retractable transverse elements 7, associated with corresponding walls 3, from at least one passive configuration, in which they are retracted toward the walls 3, to at least one active configuration, in which they protrude transversely from the space occupation of the walls 3. In this manner they ensure mechanical interference with the fall of the horticultural products A following the subsequent rise of the head 2.

In a step d., the method in fact provides for transferring the head 2 toward at least one unloading position, in which the walls 3 face and are proximate to the collection container in which one wishes to accumulate the apples.

When the head 2 has reached the unloading position, the method provides, in a step e., for causing the return of the transverse elements 7 from the active configuration to the passive configuration, allowing the free release of the horticultural products A into the respective collection container.

Usefully, in a preferred embodiment, the method according to the disclosure provides for repeating iteratively, on successive operating cycles, the step a., the step b., the step c., the step d. and the step e., and in subsequent steps e. the horticultural products A are released into the same container, accumulating them in successive superimposed layers.

In practice it has been found that the unit 1 and the method according to the disclosure fully achieve the intended aim and advantage, since they allow to arrange in a same container the horticultural products A even on multiple layers in a practical and easy manner.

The tanks B and the containers can thus be chosen with modest dimensions, ensuring in any case the possibility to accumulate large quantities of apples in the same container.

This result is achieved without neglecting respect for the conveyed products A but vice versa by ensuring in each step of the method a delicate treatment thereof, avoiding damage or impacts.

Furthermore, the disclosure requires a structure that is simple and has modest space occupations, without forcing the occupation of large areas of the assigned building and/or expensive interventions on the infrastructures or foundations.

The disclosure thus conceived is susceptible of numerous modifications and variations.

For example, both the head 2 and the matrix 8 (and their main components described above) are flexible, easily adaptable to the various grades of the apples. The walls 3 and the partitions 9 can therefore be assembled in a modular manner according to (common) center distances that can vary at will (as already noted in the preceding pages). FIG. 1 proposes a solution in which a single head 2 interacts with three different tanks B (and three containers), which correspond for example to the exits of a same grade of apples but in different colors. Nevertheless, the number of heads 2, of tanks B and of containers can be chosen at will.

All the parts of the machine in contact with the fruits are coated with adequate material capable of ensuring delicate contact with the apples.

There are also safety measures in order to ensure operation in accordance with currently applicable statutory provisions and to avoid damages to the products A or to the unit 1 itself even in non-nominal operating conditions. In particular, stroke limit sensors and safety devices are present in order to obviate pneumatic failures: if the failure occurs when the membranes are inflated, the respective valves remain closed to avoid the release and therefore the loss of apples. In case of failure, the robot 6 reaches a safe position that allows the operator to intervene without risks. Stopping and resetting the unit 1 therefore occur without damaging it.

All the details may furthermore be replaced with other technically equivalent elements.

In the exemplary embodiments shown, individual characteristics, given in relation to specific examples, may actually be interchanged with other different characteristics that exist in other exemplary embodiments.

In practice, the materials used, as well as the dimensions, may be any according to the requirements and the state of the art.

The disclosures in Italian Patent Application no. 102016000008492 (UB2016A000440), from which this application claims priority, are incorporated herein by reference.

The invention claimed is:

1. A unit for transferring horticultural products between at least one tank, in which the horticultural products float on a fluid mass, and at least one collection container, the unit comprising at least one tank wherein the horticultural products float on a fluid mass, and a head provided with a plurality of walls normally arranged vertically, said head being movable between at least one collection position, in which said walls are interposed between respective horticultural products, which float on the fluid mass at a respective predefined section of the tank, and at least one unloading position, in which said walls face and are proximate to the collection container, respective retractable transverse elements being associated with said walls and being movable between at least one active configuration, activated upon reaching said at least one collection position, and at least one passive configuration, activated upon reaching said at least one unloading position, in said active configuration said transverse elements protruding transversely from the space occupation of said walls for mechanical interference with the fall of the horticultural products as a consequence of the subsequent lifting of said head and transferring said head toward said unloading position, in said passive configuration said transverse elements being retracted toward said walls, for the free release of the horticultural products into the respective collection container.

2. The transfer unit according to claim 1, wherein each one of said transverse elements is shaped by at least one active portion of at least one membrane, inflated on command for its transition from said passive configuration to said active configuration.

3. The transfer unit according to claim 2, wherein said head is provided in a lower region with a plurality of parallel laminas that form respective said walls and have a substantially constant center distance that is adjusted at will, each one of said membranes being coupled, in a lower region, to a corresponding said lamina and being inflatable on command, for transition from said passive configuration, in which each membrane is substantially aligned vertically with the respective said lamina, to said active configuration, in which each membrane has an increased volume and a cylindrical shape, respective mutually opposite active portions of each pair of adjacent membranes cooperating for mechanical interference with the fall of the horticultural products.

4. The transfer unit according to claim 1, further comprising means for detecting a vertical coordinate assumed at each work cycle by the top of the horticultural products, released into the collection container at the respective said unloading position, for the correct assessment of the stroke to be imparted to said head in the subsequent work cycle and the progressive filling of a same collection container with superimposed layers of horticultural products.

5. A unit for transferring horticultural products between at least one tank, in which the horticultural products float on a fluid mass, and at least one collection container, the unit comprising a head provided with a plurality of walls normally arranged vertically, said head being movable between at least one collection position, in which said walls are interposed between respective horticultural products, which float on the fluid mass at a respective predefined section of the tank, and at least one unloading position, in which said walls face and are proximate to the collection container, respective retractable transverse elements being associated with said walls and being movable between at least one active configuration, activated upon reaching said at least one collection position, and at least one passive configuration, activated upon reaching said at least one unloading position, in said active configuration said transverse elements protruding transversely from the space occupation of said walls for mechanical interference with the fall of the horticultural products as a consequence of the subsequent lifting of said head and transferring said head toward said unloading position, in said passive configuration said transverse elements being retracted toward said walls, for the free release of the horticultural products into the respective collection container, further comprising means for detecting a vertical coordinate assumed at each work cycle by the top of the horticultural products, released into the collection container at the respective said unloading position, for the correct assessment of the stroke to be imparted to said head in the subsequent work cycle and the progressive filling of a same collection container with superimposed layers of horticultural products, wherein said detection means comprise at least one proximity sensor anchored in a lower region to said head between respective said laminas and is directed toward said transverse elements for the measurement of the vertical coordinate assumed at each work cycle by the top of corresponding horticultural products.

6. A unit for transferring horticultural products between at least one tank, in which the horticultural products float on a fluid mass, and at least one collection container, the unit comprising a head provided with a plurality of walls normally arranged vertically, said head being movable between at least one collection position, in which said walls are interposed between respective horticultural products, which float on the fluid mass at a respective predefined section of the tank, and at least one unloading position, in which said walls face and are proximate to the collection container, respective retractable transverse elements being associated with said walls and being movable between at least one active configuration, activated upon reaching said at least one collection position, and at least one passive configuration, activated upon reaching said at least one unloading position, in said active configuration said transverse elements protruding transversely from the space occupation of said walls for mechanical interference with the fall of the horticultural products as a consequence of the subsequent lifting of said head and transferring said head toward said unloading position, in said passive configuration said transverse elements being retracted toward said walls, for the free release of the horticultural products into the respective collection container, further comprising an apparatus for controlling a delivered power, at least proximate to the reaching of said unloading position, for the prompt detection of any peaks of delivered power, which correspond to the resistance offered by horticultural products previously incorrectly positioned in the collection container.

* * * * *